United States Patent
Kranz (10) Patent No.: US 7,176,661 B2
(45) Date of Patent: Feb. 13, 2007

(54) DC VOLTAGE CONVERTER AND METHOD FOR CONVERTING A DC VOLTAGE

(75) Inventor: Christian Kranz, Ratingen Lintorf (DE)

(73) Assignee: Infineon Technologies AG, Munich (DE)

( * ) Notice: Subject to any disclaimer, the term of this patent is extended or adjusted under 35 U.S.C. 154(b) by 35 days.

(21) Appl. No.: 11/169,457

(22) Filed: Jun. 29, 2005

(65) Prior Publication Data

US 2006/0007617 A1   Jan. 12, 2006

(30) Foreign Application Priority Data

Jun. 29, 2004   (DE) ...................... 10 2004 031 393

(51) Int. Cl.
    *G05F 1/40*   (2006.01)
(52) U.S. Cl. ........................ 323/222; 323/282; 323/267
(58) Field of Classification Search ........ 323/282–288, 323/222, 225, 267–271
    See application file for complete search history.

(56) References Cited

U.S. PATENT DOCUMENTS

| | | | |
|---|---|---|---|
| 5,617,015 A | 4/1997 | Goder et al. | |
| 5,751,139 A | 5/1998 | Jordan et al. | |
| 6,222,352 B1 * | 4/2001 | Lenk | 323/267 |
| 6,426,612 B1 * | 7/2002 | Rozsypal | 323/282 |
| 6,437,545 B2 | 8/2002 | Sluijs | |
| 6,504,267 B1 * | 1/2003 | Giannopoulos | 307/31 |
| 6,900,620 B2 * | 5/2005 | Nishimori et al. | 323/222 |

FOREIGN PATENT DOCUMENTS

| | | |
|---|---|---|
| DE | 102 49 802 A1 | 5/2004 |
| EP | 1 067 662 A1 | 1/2001 |
| WO | WO 99/61965 A1 | 12/1999 |

OTHER PUBLICATIONS

U.S. Appl. No. 11/170,527, filed Jun. 29, 2005, Leyk et al.

* cited by examiner

*Primary Examiner*—Rajnikant B. Patel
(74) *Attorney, Agent, or Firm*—Eschweiler & Associates, LLC (57) ABSTRACT

A DC voltage converter and a method for converting a DC voltage into a plurality of output-side DC voltages are disclosed. A reference variable for a control loop is provided at one output, while a respective threshold value comparison is carried out at the other outputs. An energy store at the input of the DC voltage converter can be changed over to different output branches in a manner dependent on the threshold value comparison. The energy store is driven using the control loop. The proposed principle makes it possible, with a high degree of efficiency, to provide various DC voltages with little crossover influence between the outputs and, at the same time, with constant output voltages.

16 Claims, 4 Drawing Sheets

DC VOLTAGE CONVERTER AND METHOD FOR CONVERTING A DC VOLTAGE

REFERENCE TO RELATED APPLICATIONS

This application claims the benefit of the priority date of German application DE 10 2004 031 393.8, filed on Jun. 29, 2004, the contents of which are herein incorporated by reference in its entirety.

FIELD OF THE INVENTION

The present invention relates to a DC voltage converter having a plurality of outputs and to a method for converting a DC voltage into a plurality of output-side DC voltages.

BACKGROUND OF THE INVENTION

DC voltage converters having a plurality of outputs are also referred to as multichannel DC voltage converters.

DC voltage converters of this type convert a DC voltage that is applied on the input side into a plurality of output DC voltages which are usually different.

DC voltage converters are used, for example, in integrated circuits in order to provide a plurality of different supply voltages for function blocks of the integrated circuit. In this case, it is particularly important for the output DC voltages to each have a constant value. In particular, load changes at the outputs should not result in excessive voltage increases and/or in voltage dips.

The problem with known step-up converters having a plurality of outputs is that there may be undesirable crossover influence (also referred to as crosstalk) between the various outputs. It is furthermore desirable to provide the step-up converter in such a manner that it has a relatively high degree of efficiency but, at the same time, to ensure the described load-independent constancy of the output voltages.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to a DC voltage converter, which has a plurality of outputs and provides constant output voltages with little crosstalk. The invention also includes a method to convert a DC voltage into a plurality of output-side DC voltages that are constant and exhibit little crosstalk.

As regards the apparatus, a DC voltage converter comprises an energy store connected to an input configured to supply a DC voltage, a first output configured to provide a first output voltage, and a second output configured to provide a second output voltage. The converter also comprises a first means for influencing the voltage magnitude, wherein the first means couples the energy store to the first output, and a second means for influencing the voltage magnitude, wherein the second means couples the energy store to the second output. The converter further includes a common means for influencing the voltage magnitude that is coupled to the energy store, a control loop, which comprises a regulator and couples the first output to the common means, and a first threshold value comparator, which couples the second output to the first and second means for influencing the voltage magnitude via a control block.

In accordance with the present invention, a DC voltage converter having an input and a plurality of outputs is formed. Different DC voltages may be provided at the outputs. In this case, only the output voltage of the first output is passed, in a control loop, to the common means for influencing the voltage magnitude, said means, in turn, being coupled to the energy store. The second output is not connected to the control loop but rather to the threshold value comparator. The threshold value comparator couples the second output, via the control block, to the first and second means for influencing the voltage magnitude. The second output is therefore set via a threshold value controller. If the output voltage overshoots (which can be detected using the threshold value comparator), a changeover to another output branch is carried out. In contrast, in the case of the first output, an output voltage error at the first output is used as an input variable for a control loop. In this case, the common means for influencing the voltage magnitude is driven, using the control loop, in such a manner that an output voltage error at the first output disappears or is as small as possible. Since the voltage at the second input is also dependent on the voltage magnitude being influenced using the common means for influencing the voltage magnitude (which means is coupled to the energy store), regulating the first output also means that the second output is automatically concomitantly regulated. From the point of view of the first output, the conditions at the second output are also load changes which, however, are not reflected directly but rather only indirectly in an output voltage error at the first output. Overall, the described design of the DC voltage converter ensures that constant output DC voltages are provided with little crossover influence.

In accordance with one embodiment of the invention, the DC voltage converter comprises a third output, which is intended to provide a third output voltage. The third output is associated with a third means for influencing the voltage magnitude. The third means for influencing the voltage magnitude couples the energy store to the third output. The third output is associated with a further threshold value comparator, which couples the third output to the control block. The control block is coupled to the first, second and third means for influencing the voltage magnitude. In this example, only the first output is coupled to the control loop comprising the regulator and thus to the common means for influencing the voltage magnitude.

Analogously thereto, further outputs having further means for influencing the voltage magnitude and having further threshold value comparators may also be provided.

If n outputs for providing n output voltages are therefore provided, this means, in accordance with the present invention, that a number of n−1 outputs is set using a threshold value controller. This means that an output is supplied from the energy store until the desired value of the output voltage is reached. Overshooting of the output voltage of the respective output is detected and a changeover to another output is then immediately carried out. The means for influencing the voltage magnitude which are connected to the respective output are used for this purpose. Only the first output is actually directly regulated to a desired value in a control loop. The other outputs of the number n−1 are subjected only indirectly to desired value regulation which is used to control the charging and discharging behavior of the energy store via the common means for influencing the voltage magnitude.

In accordance with an embodiment of the invention, the common means for influencing the voltage magnitude comprises a switch. The switch is used to turn a charging operating mode of the energy store on and off.

The first, second and possibly further means for influencing the voltage magnitude each comprise a switch and a charge store in one example. The switch is used to charge the charge store during a respective discharging operating mode of the energy store. Diodes may additionally be provided.

In one example the energy store comprises a series inductance. The charge stores in one example comprise backup capacitors.

The design of the DC voltage converter is, in one example, based on the structure of a step-up voltage converter having a plurality of outputs.

In accordance with another embodiment, each output of the DC voltage converter, that is to say even the first output of the DC voltage converter, is associated with a respective threshold value comparator and is coupled to the latter. In this case, the threshold value comparator is coupled, via the control block, to that means for influencing the voltage magnitude which is associated with the respective output of the voltage converter.

Provision is also made of a multiplexer, which can be used to connect each one of the outputs to the control loop. It is therefore possible for the function of that output which is subjected to direct regulation to a desired value to be cyclically swapped with that of the other outputs and thus to be rotated. The respective outputs which are not subjected to direct regulation are each monitored for maximum value and/or minimum value overshooting using the threshold value comparator and, if the threshold is overshot or undershot, a changeover to another output is carried out, as described above.

Cyclically rotating the channels means that the error of the first channel is used for regulation in a first interval of time, the error of the second output channel is used in a second interval etc. This ensures that each channel is subjected to regulation, albeit in succession. This, in turn, ensures that the invention also reliably adjusts the outputs of the DC voltage converter to constant potential values when no electrical load is connected to the first output.

The DC voltage converter is preferably a secondary-clocked switching regulator. In one example, the regulator of the DC voltage converter comprises a pulse width modulator. Alternatively, it is also possible to use other modulation methods or switching methods, for example frequency modulation.

The control loop may comprise an analog/digital converter, which is connected upstream of the regulator and thus connects the first output to the regulator. This makes it possible to design the regulator as a digital module by implementing, for example, a digital pulse width modulation principle.

The DC voltage converter in accordance with one embodiment of the invention is advantageously designed using integrated circuit technology.

Overall, on account of the control loop, the proposed DC voltage converter precisely regulates the outputs to a desired value. At the same time, on account of it being possible to change over the outputs, little crossover influence between the various outputs is also ensured. The voltage converter can have a very high degree of efficiency on account of the switched operation.

The energy store may comprise a common coil, with the result that the circuit can be produced in integrated fashion in a particularly cost-effective manner by integrating only one coil.

The invention also includes a method for converting a DC voltage into a plurality of output-side DC voltages. The method comprises supplying a DC voltage to an input, and using the DC voltage to charge an energy store. The method also includes providing a first output voltage at a first output in a manner dependent on the state of charge of the energy store, providing a second output voltage at a second output in a manner dependent on the state of charge of the energy store, and regulating the charging operation of the energy store in a manner dependent on the first output voltage in a control loop. Further, a threshold value comparison is performed with respect to the second output voltage and the second output voltage is influenced in a manner dependent on the comparison result.

In accordance with one embodiment of the method, the first output voltage is regulated to a desired value in a regulating operation. A threshold value comparison is carried out with respect to the second output and the second output voltage is controlled by deliberately changing over between the first and second outputs, as regards the discharge of the energy store, in a manner dependent on the comparison result.

A first charge store at the first output and a second charge store at the second output are alternately charged, in one example, in a manner dependent on the threshold value comparison.

The temporal charging phase of the first charge store and the charging phase of the second charge store in a respective discharging operating mode of the energy store are temporally separate from a charging operating mode in which the energy store is charged in one example.

Charging of the energy store and thus the magnitude of the current that flows from the energy store in the charging operating modes of the charge stores during a discharging operation of the energy store may be regulated using pulse width modulation.

The voltage at the first output is used as a reference variable for the control loop in one example.

Alternatively or in addition, the sum of all of the output voltage errors of all of the outputs can be used as a reference variable for regulation.

In yet another embodiment of the invention, the sum of the output errors, multiplied by the respective pulse width, at the respective output is used as a reference variable for the control loop. Since the pulse width at the respective output is proportional to the output current, the error that is formed in this manner, that is to say the reference variable, is a measure of the output power error of the entire voltage converter. The output power error becomes zero only when either the pulse width tends toward zero, that is to say when no load is connected to the respective output, or the output voltage error itself tends toward zero. This means that the error converges toward zero only when all of the output voltages correspond to the respective desired value.

Alternatively, the sum of the sum of output errors of all of the outputs and the sum of output errors of all of the outputs weighted with the respective pulse width at the output may also be used as a reference variable. As a result, even unloaded outputs are still subjected to regulation. This also applies when the pulse width of a channel is zero.

In the inventive method for converting a DC voltage into a plurality of output-side DC voltages, the functions of the outputs may be cyclically interchanged. This means that the error at the first output is used for regulation in a first interval of time, the error of the second channel is used in the second interval of time etc. This ensures that each channel and thus each output voltage are taken into account, at successive times but not simultaneously, for direct regulation to a desired value.

In this case, the charging operation of the energy store is periodically alternately regulated in a manner dependent on the first output voltage in a control loop and on the second output voltage in the control loop, a threshold value comparison being carried out with respect to those output voltages which are not used directly as a reference variable for the control loop, and the output voltage at this output being influenced in a manner dependent on said threshold value comparison.

This method can also be advantageously developed by sorting the outputs on the basis of the respective electrical load at the output. This means that that output which requires the largest portion of current from the energy store is the first output. The other outputs are likewise sorted in descending order on the basis of the current required in one example. During operation with pulse width modulation, this means that the output having the widest pulse width at the time is first of all used, together with its output voltage, as a reference variable for regulation, then that output having a narrower pulse width and finally the channel having the narrowest pulse width.

In yet another embodiment of the method for converting DC voltage, that output which has the widest pulse width at the time is always selected as a reference variable for the control loop. As a result, even fewer changeover operations are required. This, in turn, results in the noise being reduced in the output voltages.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in more detail below using a plurality of exemplary embodiments and with reference to drawings, in which.

DETAILED DESCRIPTION OF THE INVENTION

Figure 1:
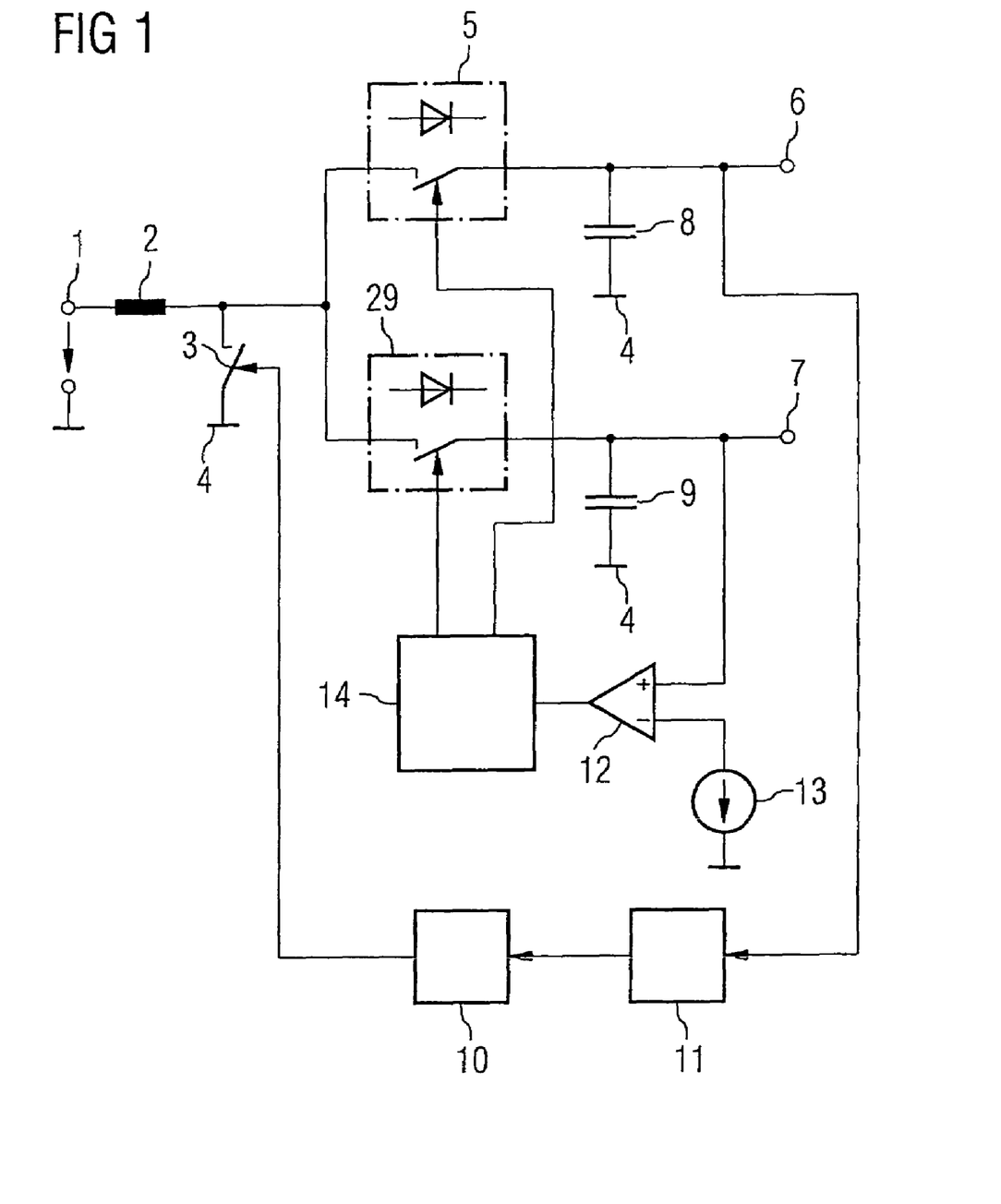
FIG. 1 is a schematic block diagram illustrating a first exemplary embodiment of a DC voltage converter in accordance with the present invention.

FIG. 1 shows a DC voltage converter, which is suited to converting a DC voltage that is applied on the input side into two different output DC voltages. In this case, an input 1 for supplying a DC voltage is provided, an energy store 2 in the form of a coil being connected to the input. The free terminal of the energy store 2 is connected to a reference potential terminal 4 via a switch 3. The circuit node that is formed between the energy store 2 and the switch 3 is furthermore connected to a first output 6 via a first means for influencing the voltage magnitude 5 and to a second output 7 via a second means for influencing the voltage magnitude 29. The first and second outputs 6, 7 are each designed to provide an output voltage in the form of a DC voltage. The first and second outputs 6, 7 are connected to the reference potential terminal 4 via a respective charge store 8, 9 that is in the form of a capacitor. The switches 5, 29 have a diode function in order to make it possible to increase the voltage and avoid charge carriers flowing back.

Provision is also made of a control loop, which comprises a regulator 11 and couples the first output 6 to a common means for influencing the voltage magnitude 3, 10. The common means for influencing the voltage magnitude comprises a modulator 10 and the switch 3 (already described). In the present example, the modulator comprises a pulse width modulator. A threshold value comparator 12 is connected, by way of a non-inverting input, to the second output 7 and, by way of an inverting input, to a voltage source 13, which provides a threshold value that can be set. The output of the threshold value comparator 12 is connected to respective control inputs of the first and second means for influencing the voltage magnitude 5, 29 via a control block 14.

The energy store 2 is regularly charged with a current which is provided by a voltage source that is connected to the input 1. A discharging current of the energy store 2 is distributed to the two output branches 5, 8; 29, 9 which each comprise a switch and a charge store. In this case, the portion of current per branch is set in such a manner that the output voltage at the output 6, 7 of this branch remains virtually constant. In this case, the respective portion of current provides the instantaneous output current, that is to say load current, and additionally charges the respective backup capacitor 8, 9. The backup capacitor 8, 9 supplies a load (which is connected to the outputs 6, 7) in that period of time in which a current from the energy store 2 is not immediately available. The threshold value comparator 12 and the control block 14 are used to set the voltage at the output 7 via a threshold value controller. In this case, an output branch 29, 9 is charged from the energy store 2 until the desired value of the output voltage is reached at the output 7 (detected using the threshold value comparator 12). If the output voltage at the output 7 overshoots the threshold value provided by the threshold value voltage source 13, the control block 14 changes over to the other output branch 5, 8. A discharging current of the energy store 12 is thus applied to the output branches in succession.

The output 6 is connected to a control loop. The regulator 11 detects a deviation of the actual output voltage at the output 6 from a desired value and provides an output voltage error (obtained therefrom) as a reference variable for the control loop. If insufficient current for keeping the output voltage at the output 6 constant is available for the output 6, the current provided by the energy store 2 must be increased; if, conversely, the output voltage has overshot the desired value, the current provided by the energy store 2 is too large.

It goes without saying that the current that remains for the first output 6 is not only dependent on the electrical load at this output but also on the electrical loads at the other outputs. This means that the output voltages at the other outputs are also concomitantly regulated by adjusting the voltage at the first output 6.

The means for influencing the voltage magnitude 5, 29 are driven in such a manner that the outputs 6, 7 are not simultaneously connected to the energy store 2.

Overall, the proposed DC voltage converter provides a plurality of constant output voltages with little crossover influence between the different outputs. In addition, a high degree of efficiency is ensured on account of the switched operation. Since only one common energy store 2 in the form of a coil is required, the costs involved in producing the converter using integrated circuit technology are also low.

Figure 2:
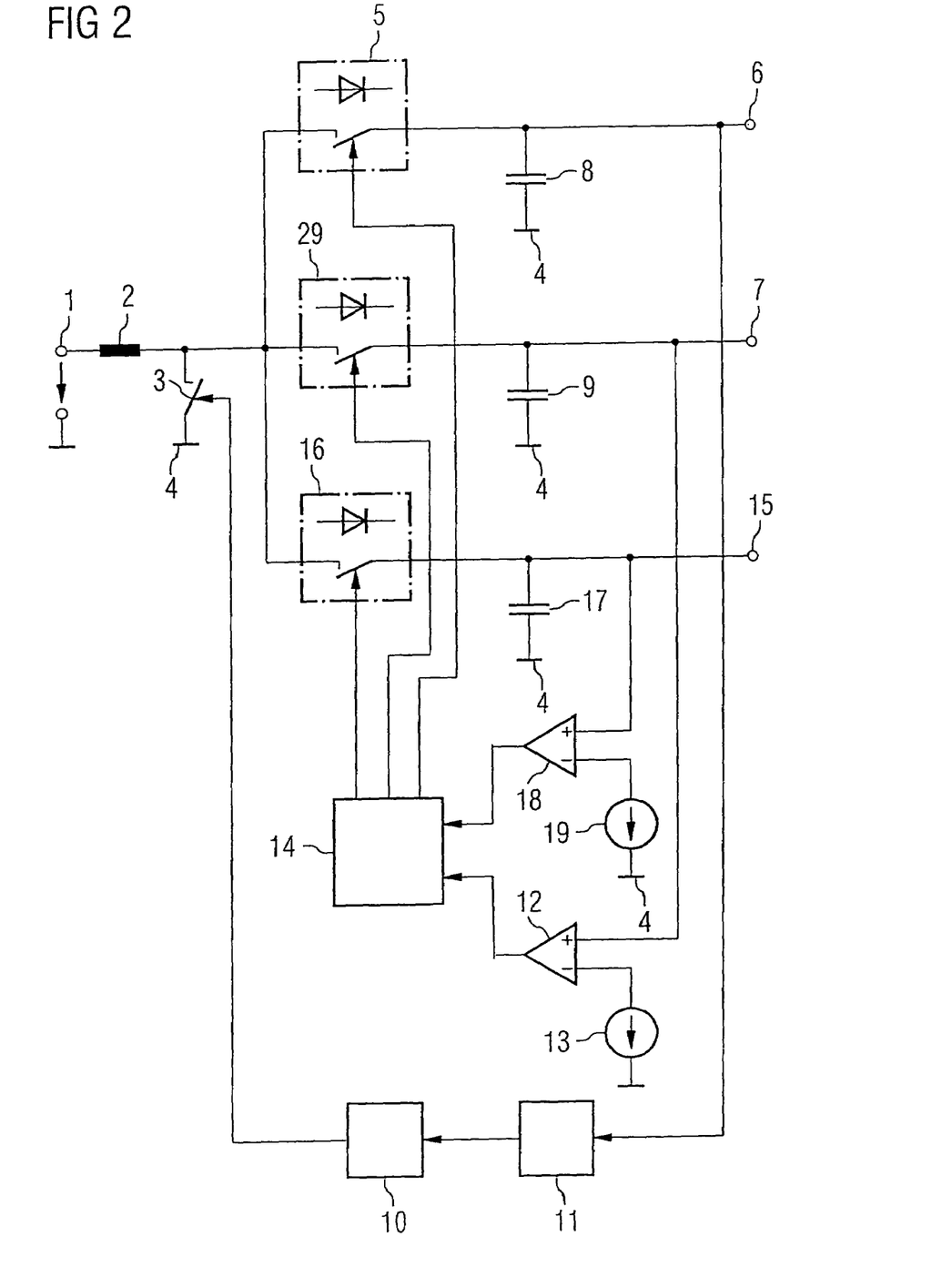
FIG. 2 is a schematic block diagram illustrating a development of the DC voltage converter of FIG. 1 having three outputs.

FIG. 2 shows a development of the DC voltage converter of FIG. 1, with which it largely coincides in terms of the components used, their connection to one another and the advantageous functioning. In this respect, the description shall not be repeated at this juncture. In addition, a further output 15, at which a third output voltage is provided, is illustrated in FIG. 2. To this end, the circuit node that connects the energy store 2 to the switch 3 is connected to the third output 15 via a third means for influencing the voltage magnitude 16. In addition, the third output 15 is connected to the reference potential terminal 4 via a further charge store 17 that is in the form of a capacitor. Analogously to the second output 7, the third output 15 is connected to the non-inverting input of a further threshold value comparator 18 whose inverting input is connected to the reference potential terminal 4 via a voltage source 19. The voltage source 19 provides a second threshold value. The output of the further threshold value comparator 18 is connected to the control block 14. In addition to the first and second means for influencing the voltage magnitude 5, 29, the control block 14 also drives the third means for influencing the voltage magnitude 16. In order to prevent energy from flowing back in an undesirable manner from the charge stores 8, 9, 17 or the outputs 6, 7, 15 into the energy store 2, all three means for influencing the voltage magnitude 5, 7, 16 each have diode functionality.

The circuit of FIG. 2 indicates the basic principle of the present invention, namely that the voltage magnitude of all of the outputs 7, 15, except for one output, is set via a threshold value controller 12, 13; 18, 19. Only the output 6 has a real regulating function as regards the output voltage, said regulating function being implemented via the regulator 11 and the common means for influencing the voltage magnitude 3, 10. As a result, the advantages which can already be achieved using FIG. 1, such as a high degree of efficiency, little crossover influence and the guarantee of constant output voltages, can also be realized for three output voltages.

It goes without saying that, in alternative embodiments, it is also within the scope of the present invention to provide further output voltages by extending the circuit in an appropriate manner. In this case, it is in keeping with the proposed principle to set n−1 of n outputs via a threshold value controller and to operate precisely one of the n outputs using voltage regulation. Since the control block 14 is used to change over to a respective other output branch as soon as the preset voltage threshold value is overshot, voltage regulation of the other outputs is also ensured by direct voltage regulation of the first output.

Figure 3:
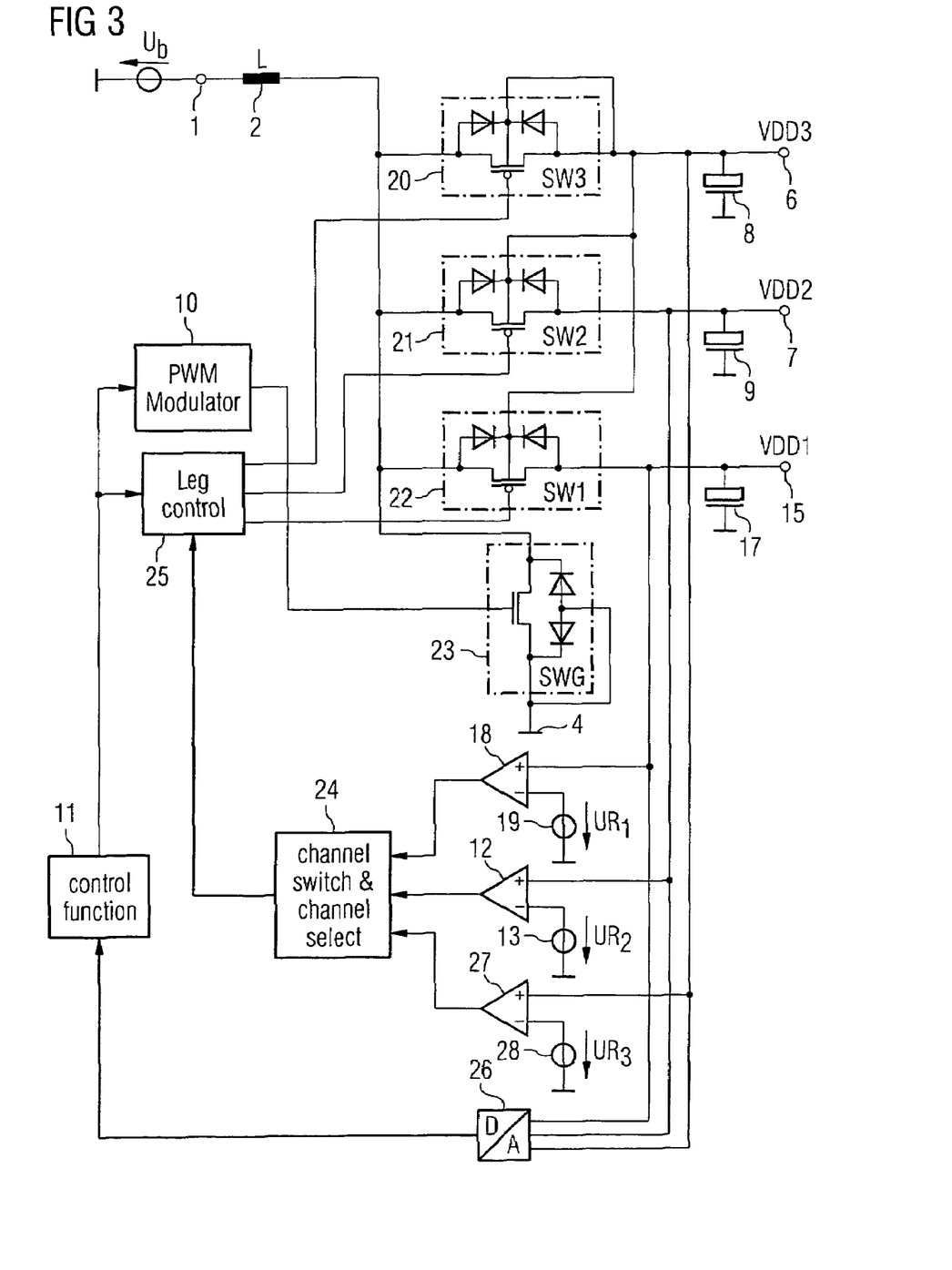
FIG. 3 is a schematic block diagram illustrating a development of the circuit of FIG. 2, in which it is possible to interchange the functions of the outputs.

FIG. 3 shows a development of the circuit of FIG. 2, which largely coincides with the circuit of FIG. 2 in terms of its connection and the advantageous method of operation. In this respect, the description of the figure is not repeated at this juncture. Instead of the simple switches having a diode function 5, 29, 16, provision is made, in FIG. 3, of a first, second and third means for influencing the voltage magnitude 20, 21, 22, said means being of the same design as one another. The means for influencing the voltage magnitude 20, 21, 22 each comprise a metal oxide semiconductor (MOS) field effect transistor of the p-channel type whose gate terminal respectively forms the control input of the switch. The terminals of the controlled paths of the p-channel transistors form the load terminals of the means for influencing the voltage magnitude. These load terminals are also connected to a respective anode terminal of a respective diode, the cathode terminals of which diodes are connected to one another and to the respective output of the DC voltage converter.

The common means for influencing the voltage magnitude 23 also comprises a MOS field effect transistor and two diodes, provision being made, in this case, of an n-channel field effect transistor whose terminals of the controlled path form the load terminals of the common means for influencing the voltage magnitude and are connected to a respective cathode terminal of a respective diode, the anode terminals of which diodes are connected to one another and to the reference potential terminal 4. The gate terminal of the common means for influencing the voltage magnitude 23 is connected to a pulse width modulator 10 that is part of the control loop. In contrast to FIG. 2, each output 6, 7, 15 is connected to the regulator 11, via an analog/digital converter 26 in the present case. The regulator 11 drives the pulse width modulator 10. In this case, however, a multiplexing function is provided in the regulator 11 such that, at a particular point in time, precisely only one of the three outputs 6, 7, 15 is ever coupled to the pulse width modulator 10. In addition, provision is also made of yet another threshold value comparator 27 whose non-inverting input is connected to the first output 6 and whose inverting input is connected to the reference potential terminal 4 via a voltage source 28. The voltage source 28 provides a threshold value that can be set.

The outputs of all of the threshold value comparators 12, 18, 27 are connected to a function block 24, which is designed to change over between the channels and to select the channels. The terms channel and output branch are synonymous. The function block 24 is coupled to an output branch controller 25, which, in turn, is connected to the gate terminals of the transistors of the three means for influencing the voltage magnitude 20, 21, 22. A synchronization input of the output branch controller 25 is connected to the regulator 11. The function block 24 and the output branch controller 25 together form the control block.

In a development of the circuit of FIG. 2, the circuit of FIG. 3 makes it possible to cyclically interchange the functions of the outputs 6, 7, 15. This means that an output voltage error at the first output 6 is used for regulating purposes in a first phase, the error of the second output 7 is used in a second phase and the error at the output 15 is used in a third phase. This ensures that each output voltage is alternately adjusted. This means that it is irrelevant which of the outputs is electrically loaded, and no convergence problems can arise either. Selection of the outputs 6, 7, 15 for the purpose of providing a reference variable for the control loop can either change periodically (as described) or weighted sorting can be carried out on the basis of the output load. This means that the output which currently requires the largest portion of current always provides the reference variable. In this case, the pulse width of the respective output channel is to be used as the criterion. If, for example, the first output branch 6, 8, 20 has a pulse width of 13%, the second output branch 29, 9, 21 has a pulse width of 4% and the third channel 15, 17, 22 has a pulse width of 7%, a switching sequence from the second to the third to the first output 7, 15, 6 results for the outputs.

In another alternative operating mode, that output 6, 7, 15 which currently has the widest pulse width at the time is respectively used to provide the reference variable. This reduces the number of changeover operations and thus also the noise in the output voltages at the outputs 6, 7, 15.

Figure 4:
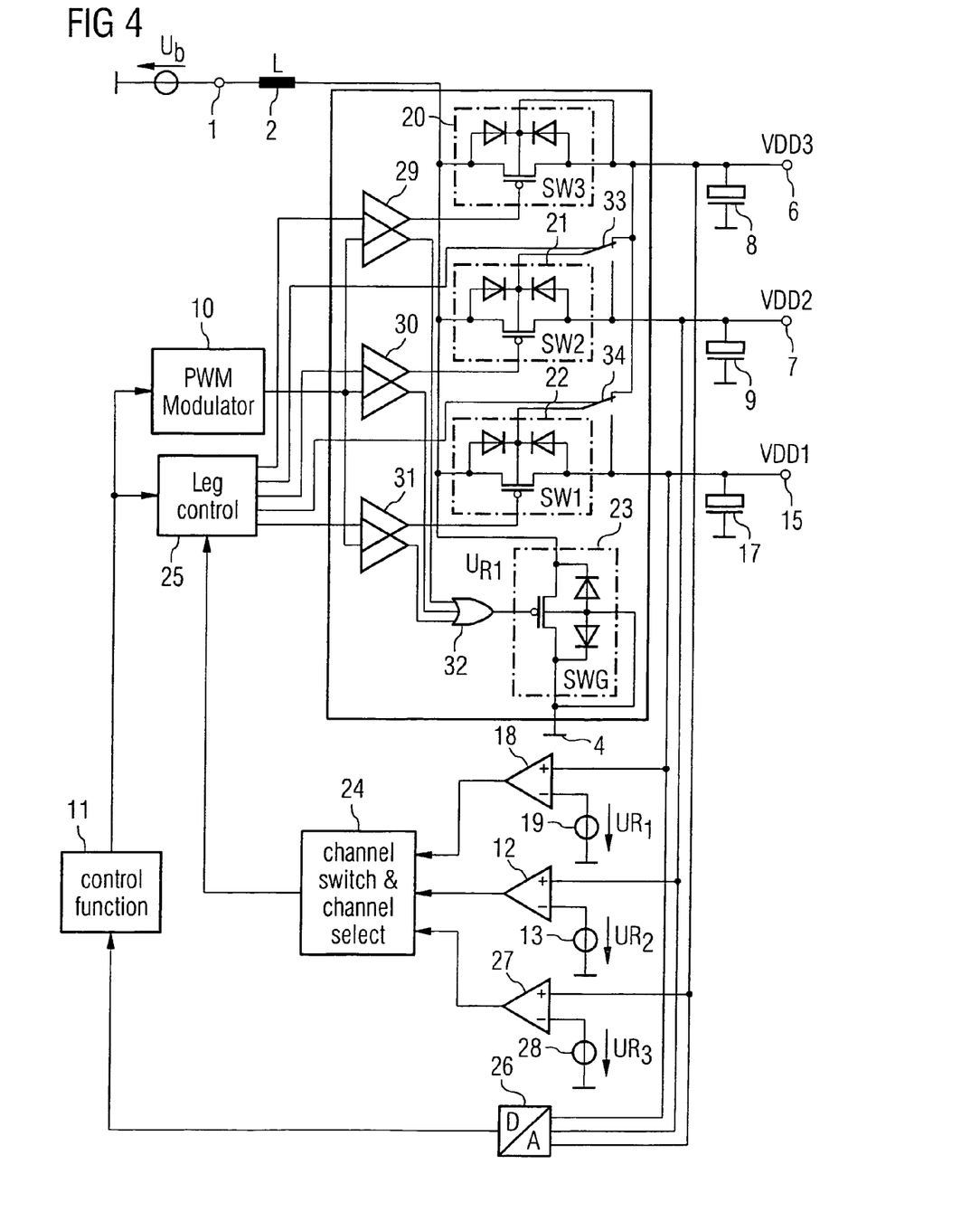
FIG. 4 is a schematic block diagram illustrating a development of the circuit of FIG. 3, in which the switches are driven in an improved manner.

FIG. 4 shows a development of the circuit of FIG. 3, which largely corresponds to the latter in terms of the components used, their connection and the advantageous functioning.

In this respect, the description of the figure is not repeated at this juncture. In FIG. 4, however, a multiplicity of driver stages 29, 30, 31 and a logic gate 32 are provided for the purpose of driving the means for influencing the voltage magnitude 20, 21, 22 and for the purpose of driving the common means for influencing the voltage magnitude 23. Said driver stages and logic gate are used to couple the switching signals which are provided by the pulse width modulator 10 and by the output branch controller 25 to one another. The driver stages 29, 30, 31 are thus double driver stages which each have a first and a second input and a first and a second output. The first inputs of the driver stages 29 to 31 are each connected to outputs of the branch controller 25, while the second inputs are connected to the output of the pulse width modulator 10. The first outputs of the driver stages 29 to 31 are connected to respective gate terminals of the means for influencing the voltage magnitude 20 to 22, while the second outputs are combined with one another in the AND module 32 whose output is connected to the gate terminal of the common means for influencing the voltage magnitude 23. This is used to comply with overlap-free times. Provision is also made, in FIG. 4, of two further switches 33, 34 which are each driven by the branch controller 25. The switches 33, 34 optionally connect the common cathode terminal of the second and third means for influencing the voltage magnitude 21, 22 to the first output 6 or to the second or third output 7, 15. This is used to change over between various operating modes of the DC voltage converter that is operated in a clocked manner.

In the circuits of FIGS. 3 and 4, a respective threshold value comparator 18, 12, 27 is used to monitor the voltage at each output 6, 7, 15. The threshold value comparators are used to ascertain whether the output voltage at the outputs 6, 7, 15 is greater than or less than a prescribable reference value. The function block 24 selects the relevant output using the decisions of the threshold value comparators and a selection criterion for the next channel. The outputs are switched through only during a discharging operating mode of the energy store 2 and not during its charging phase. That output which had the largest charging current or the largest pulse width in the preceding period is selected as that channel at whose output the reference variable for the control loop is provided. It therefore interchanges the temporal position with that output channel which provided the reference variable in the preceding period. The analog/digital converter 26 is used to measure the output voltage error at the selected output and to feed it to the regulator 11. This regulator 11 changes the pulse width for the charging phase of the energy store in such a manner that the output voltage error is as small as possible at the selected channel that provides the reference variable. In this case, the regulation coefficients may be dependent on the channel.

In summary, the proposed principle affords a high degree of efficiency, little crossover influence between the output voltages, little noise and low costs when produced as an integrated circuit.

It goes without saying that the exemplary embodiments shown do not serve to limit the invention but rather only to illustrate it.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A DC voltage converter, comprising:
an energy store connected to an input configured to supply a DC voltage;
a first output configured to provide a first output voltage;
a second output configured to provide a second output voltage;
a first means for influencing the voltage magnitude, said first means coupling the energy store to the first output;
a second means for influencing the voltage magnitude, said second means coupling the energy store to the second output;
a common means for influencing the voltage magnitude, said common means being coupled to the energy store;
a control loop comprising a regulator and configured to couple a control signal associated with the first output to the common means for influencing the voltage magnitude; and
a first threshold value comparator configured to compare a voltage at a predetermined threshold, and output a magnitude control signal to the second means for influencing the voltage magnitude via a control block.

2. The DC voltage converter of claim 1, further comprising:
a third output configured to provide a third output voltage; and
a third means for influencing the voltage magnitude, said third means coupling the energy store to the third output, and wherein the control loop couples solely the first output to the common means for influencing the voltage magnitude.

3. The DC voltage converter of claim 1, wherein the common means for influencing the voltage magnitude comprises a switch configured to vary a charging operating mode of the energy store on and off.

4. The DC voltage converter of claim 1, wherein the first and second means for influencing the voltage magnitude each comprise a switch and a charge store configured to charge the charge store during a respective discharging operating mode of the energy store.

5. The DC voltage converter of claim 4, wherein the control block comprises means for evaluating threshold value comparison results and means for driving the switches in the first and second means for influencing the voltage magnitude.

6. The DC voltage converter of claim 1, wherein the regulator comprises a switching means configured to couple either the first output or the second output to the common means for influencing the voltage magnitude.

7. The DC voltage converter of claim 1, wherein the common means for influencing the voltage magnitude comprises a pulse width modulator configured to drive a switch configured to couple the output of the energy store to a reference potential terminal.

8. The DC voltage converter of claim 1, wherein the control loop further comprises an analog/digital converter connected upstream of the regulator.

9. The DC voltage converter of claim 1, wherein the energy store comprises an inductance.

10. The DC voltage converter of claim 1, wherein the DC voltage converter comprises a step-up voltage converter configured to convert a DC voltage that is applied at the input into a plurality of different DC voltages which are provided at the respective outputs.

11. The DC voltage converter of claim 1, wherein the first and second means for influencing the voltage magnitude each comprise a forward-biased diode.

12. A method for converting a DC voltage into a plurality of output-side DC voltages, comprising:
supplying a DC voltage to an input;
using the DC voltage to charge an energy store;
providing a first output voltage at a first output in a manner dependent on the state of charge of the energy store;
providing a second output voltage at a second output in a manner dependent on the state of charge of the energy store;
regulating a charging operation of the energy store in a manner dependent on the first output voltage in a control loop; and
carrying out a threshold value comparison with respect to the second output voltage and influencing the second output voltage in a manner dependent on the comparison result.

13. The method of claim 12, further comprising charging a first charge store at the first output from the energy store in a manner dependent on the comparison result, and then charging a second charge store at the second output.

14. The method of claim 12, further comprising charging the first charge store and charging the second charge store in a respective discharging operating mode of the energy store, wherein the discharging operating modes of the first and second charge stores are temporally separate from charging the energy store in a charging operating mode.

15. The method of claim 12, wherein regulating the charging operation of the energy store is performed using pulse width modulation.

16. The method of claim 12, wherein regulating the charging operation comprises regulating the charging operation of the energy store in a periodically alternating way in a manner dependent on the first output voltage in a control loop and on the second output voltage in the control loop, wherein a threshold value comparison is carried out with respect to an output voltage which is not used directly as a reference variable for the control loop, and the output voltage being influenced in a manner dependent on the threshold value comparison.

* * * * *